US012720251B2

(12) United States Patent
Freeman et al.

(10) Patent No.: US 12,720,251 B2
(45) Date of Patent: Aug. 25, 2026

(54) PERSONALIZED SOUND VIRTUALIZATION

(71) Applicant: Bose Corporation, Framingham, MA (US)

(72) Inventors: Eric Freeman, Sutton, MA (US); John Rule, Berlin, MA (US)

(73) Assignee: Bose Corporation, Framingham, MA (US)

( * ) Notice: Subject to any disclaimer, the term of this patent is extended or adjusted under 35 U.S.C. 154(b) by 197 days.

(21) Appl. No.: 18/470,101

(22) Filed: Sep. 19, 2023

(65) Prior Publication Data

US 2025/0097625 A1 Mar. 20, 2025

(51) Int. Cl.

*H04R 1/10* (2026.01)
*H04R 1/08* (2006.01)
*H04S 7/00* (2006.01)

(52) U.S. Cl.

CPC ............. *H04R 1/1058* (2013.01); *H04R 1/08* (2013.01); *H04R 1/1041* (2013.01); *H04S 7/304* (2013.01); *H04S 7/308* (2013.01); *H04R 2201/10* (2013.01)

(58) Field of Classification Search

CPC ......... H04R 5/033; H04S 7/302; H04S 7/304; H04S 7/301; H04S 2420/01
See application file for complete search history.

(56) References Cited

U.S. PATENT DOCUMENTS

| | | | | |
|---|---|---|---|---|
| 9,848,273 | B1 * | 12/2017 | Helwani | H04R 25/552 |
| 11,190,896 | B1 | 11/2021 | Satongar | |
| 2017/0195793 | A1 | 7/2017 | Vilermo | |
| 2019/0215637 | A1 * | 7/2019 | Lee | H04R 5/033 |

FOREIGN PATENT DOCUMENTS

| | | | |
|---|---|---|---|
| EP | 4072164 | A1 | 10/2022 |

OTHER PUBLICATIONS

International Search Report and the Written Opinion of the International Searching Authority, PCT Application No. PCT/US2024/046346, dated Jan. 3, 2025, pp. 1-12.

* cited by examiner

*Primary Examiner* — Kile O Blair

(74) *Attorney, Agent, or Firm* — Bond, Schoeneck & King, PLLC

(57) ABSTRACT

A method for personalized sound virtualization is provided. The method includes measuring environmental sound using a first microphone of a wearable audio device. The first microphone is in or proximate to a right ear of a user. The method further includes measuring the environmental sound using a second microphone of the wearable audio device. The second microphone is in or proximate to a left ear of the user. The method further includes using acoustic data obtained from the measuring of the environmental sound via the first and second microphones, calculating individualized parameters, such as interaural time delay, relating to individualized HRTFs for the user. The method further includes using the individualized parameters to adjust audio playback by the wearable audio device. The audio playback may be adjusted at least partially based on an individualized HRTF generated by adjusting a generic HRTF according to the individualized parameters.

18 Claims, 14 Drawing Sheets

Azimuth

PERSONALIZED SOUND VIRTUALIZATION

FIELD OF THE DISCLOSURE

The present disclosure is directed generally to systems and methods for providing personalized sound virtualization, e.g., adjusting audio playback according to acoustic data captured by microphones of a wearable audio device.

BACKGROUND

When listening to audio content over near-field speaker systems, such as headphones or earbuds, particularly stereo devices, many listeners perceive the sound as coming from "inside their head." Sound virtualization refers to the process of making sounds that are rendered over such systems sound as though they are coming from the surrounding environment, i.e. the sounds are "external" to the listener, which may be referred to herein as sound externalization or sound virtualization. Alternately stated, the sounds may be perceived by the listener as coming from a virtual source rather than from inside their head. The audio generated via sound virtualization may be referred to as spatialized audio. Head related transfer functions (HRTFs) can be used to give the listener cues that help them perceive the sound as though it were coming from "outside their head." HRTFs represent the acoustic qualities of a head of a user and their impact on sound. Sound virtualization systems typically use one or more generic HRTFs configured to correspond to a wide array of users. While generic HRTFs work well for most users, some users have a head geometry or other acoustic characteristics which do not correspond to the generic HRTFs. For these users, sound virtualization using a generic HRTF may fail to provide an accurate external listening experience.

SUMMARY OF THE DISCLOSURE

The present disclosure provides systems and methods for providing personalized sound virtualization via a wearable audio device (such as audio headphones, a set of earbuds, an audio headset, etc.) worn by a user. The present disclosure recognizes that acoustic data captured by microphones of the wearable audio device proximate to the left and right ears of the user may be used to determine individualized parameters related to head related transfer functions (HRTF) for the user. The individualized parameters may be used to adjust audio playback of the wearable audio device, thereby providing personalized sound virtualization. In particular, the individualized parameters can be used to transform a generic HRTF stored by the wearable audio device into an individualized HRTF customized for the user or to select from a set of generic HRTFs corresponding to varying head geometries. This individualized HRTF may reflect the head geometry or other acoustic characteristics of the user. Individualizing the generic HRTF provides a more accurate HRTF for each user and more consistent spatial audio experiences across a range of different users. Accordingly, the individualized HRTFs provide a more desirable and impactful listening experience regardless of each individual user's specific physical characteristics (such as head size). Further, these systems and methods enable personalized sound virtualization without requiring knowledge of sources of environmental sound other than the sound received by the microphones of the wearable audio device.

In one example, at least one of the individualized parameters is an interaural time delay. The interaural time delay represents the difference in arrival time of sound at the right ear and the left ear of the user. The interaural time delay typically corresponds to a head width of the user, wherein wider head widths correspond with longer interaural time delays. The interaural time delay may be determined by first cross-correlating acoustic data captured by the microphones over a time period to determine time delay data over time. For audio originating in a median plane approximately equidistant between the two microphones, the time delay will be close to zero. For audio originating at 90 degrees or 270 degrees azimuth and zero degrees elevation from the user, the time delay will be a maximum and a function of the width of the head of the user. Accordingly, the time delay data is analyzed to determine a maximum delay value which corresponds to the interaural time delay. This interaural time delay may then be used with a known geometrical model of the wearable audio device and the head of the user to determine the width of the head of the user. This personalized interaural time delay (and/or the head width) is then used to adjust a generic HRTF to create an individualized HRTF specific to user.

Other types of individualized parameters may be derived from the captured acoustic data and processed to personalize a generic HRTF. In a further example, the individualized parameters include spectral scattering characteristics. These spectral scattering characteristics represent the impact of the head of the user on the frequency domain aspects of environmental audio. The spectral scattering characteristics may be determined by deriving and comparing spectral data from the acoustic data captured by the two microphones. The spectral scattering characteristics can include a maximum spectral difference between the spectral data captured by the first microphone and the spectral data captured by the second microphone. Like the maximum delay value, the maximum spectral difference will correspond to audio originating at 90 degrees or 270 degrees azimuth and zero degrees elevation from the user.

In some examples, systems and methods may incorporate an inertial measurement unit (IMU) arranged on or in the wearable audio device. The IMU generates motion data corresponding to the movement of the head of the user. Accordingly, the systems and methods may use the motion data to correct for the movement of the head of the user while capturing acoustic data.

If the wearable audio device already includes microphones (that are configured to be in or proximate the ears of a user) for other purposes, such as for voice pickup and/or noise cancellation purposes, then it is likely that no additional hardware would be needed to perform the aforementioned techniques. In contrast, other techniques of calculating individualized HRTFs require additional user input, require additional componentry, are complicated, are impractical, are expensive, and/or provide undesirable user experiences, such as manual measurement for each user or camera-based techniques that require a user to take one or more pictures of their ears and/or head.

Generally, in one aspect, a method for personalized sound virtualization is provided. The method includes measuring environmental sound using a first microphone a wearable audio device. The first microphone is configured to be in or proximate to a right ear of a user.

The method further includes measuring the environmental sound using a second microphone of the wearable audio device. The second microphone is configured to be in or proximate to a left ear of the user.

The method further includes, using acoustic data obtained from the measuring of the environmental sound via the first and second microphones, calculating one or more individualized parameters relating to individualized HRTFs for the user.

The method further includes using the one or more individualized parameters to adjust audio playback by the wearable audio device. According to an example, the audio playback is adjusted at least partially based on an individualized HRTF. The individualized HRTF may be generated by adjusting a generic HRTF according to the one or more individualized parameters. According to another example, the individualized HRTF may retrieved from an HRTF library based on the one or more individualized parameters. The HRTF library includes one or more stored HRTFs corresponding to one or more stored parameters.

According to an example, the one or more individualized parameters includes an interaural time delay. The interaural time delay may be determined by: (1) determining time delay data by cross correlating the acoustic data corresponding to the first microphone with the acoustic data corresponding to the second microphone; and (2) determining a maximum value of the time delay data, wherein the maximum value of the time delay data is determined over a predetermined time period.

According to an example, the one or more individualized parameters further include a head width of the user. The head width is determined based on the interaural time delay and a geometric model of the wearable audio device and a head of the user.

According to an example, the one or more individualized parameters includes spectral scattering characteristics. The spectral scattering characteristics may be determined by: (1) deriving first spectral data from the acoustic data captured by the first microphone; (2) deriving second spectral data from the acoustic data captured by the second microphone; and (3) comparing the first spectral data to the second spectral data. The spectral scattering characteristics may include a maximum spectral difference between the first spectral data and the second spectral data.

According to an example, the acoustic data may be adjusted based on motion data captured by an IMU of the wearable audio device.

Generally, in another aspect, a personalized sound virtualization system is provided. The personalized sound virtualization system includes a first microphone of a wearable audio device. The first microphone is configured to measure environmental sound. The first microphone is configured to be in or proximate to a right ear of a user.

The personalized sound virtualization system further includes a second microphone of the wearable audio device. The second microphone is configured to measure the environmental sound. The second microphone is configured to be in or proximate to a left ear of the user.

The personalized sound virtualization system further includes a processor. The processor is configured to, using acoustic data obtained from the measuring of the environmental sound via the first and second microphones, calculate one or more individualized parameters relating to individualized HRTFs for the user.

The processor is further configured to use the one or more individualized parameters to adjust audio playback by the wearable audio device. The audio playback may be adjusted at least partially based on an individualized HRTF. The individualized HRTF may be generated by adjusting a generic HRTF according to the one or more individualized parameters. According to another example, the individualized HRTF may retrieved from an HRTF library based on the one or more individualized parameters. The HRTF library includes one or more stored HRTFs corresponding to one or more stored parameters.

According to an example, the one or more individualized parameters includes an interaural time delay. The interaural time delay may be determined by: (1) determining time delay data by cross correlating the acoustic data corresponding to the first microphone with the acoustic data corresponding to the second microphone; and (2) determining a maximum value of the time delay data, wherein the maximum value of the time delay data is determined over a predetermined time period.

According to an example, the one or more individualized parameters further include a head width of the user. The head width is determined based on the interaural time delay and a geometric model of the wearable audio device and a head of the user.

According to an example, the one or more individualized parameters includes spectral scattering characteristics. The spectral scattering characteristics are determined by: (1) deriving first spectral data from the acoustic data captured by the first microphone; (2) deriving second spectral data from the acoustic data captured by the second microphone; and (3) comparing the first spectral data to the second spectral data. The spectral scattering characteristics may include a maximum spectral difference between the first spectral data and the second spectral data.

According to an example, the acoustic data is adjusted based on motion data captured by an IMU of the wearable audio device.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure provides systems and methods for providing personalized sound virtualization via a wearable audio device (such as audio headphones, a set of earbuds, an audio headset, etc.) worn by a user. The present disclosure recognizes that acoustic data captured by microphones of the wearable audio device proximate to the left and right ears of the user may be used to determine individualized parameters related to head related transfer functions (HRTF) for the user. The individualized parameters may be used to adjust audio playback of the wearable audio device, thereby providing personalized sound virtualization. In particular, the individualized parameters can be used to transform a generic HRTF stored by the wearable audio device into an individualized HRTF customized for the user or to select from a set of generic HRTFs corresponding to varying head geometries. This individualized HRTF may reflect the head geometry or other acoustic characteristics of the user. Individualizing the generic HRTF provides a more accurate HRTF for each user and more consistent spatial audio experiences across a range of different users. Accordingly, the individualized HRTFs provide a more desirable and impactful listening experience regardless of each individual user's specific physical characteristics (such as head size). Further, these systems and methods enable personalized sound virtualization without requiring knowledge of sources of environmental sound other than the sound received by the microphones of the wearable audio device.

The term "head related transfer function" or acronym "HRTF" is intended to be used broadly herein to reflect any manner of calculating, determining, or approximating head related transfer functions. For example, a head related transfer function as referred to herein may be generated or selected specific to each user, e.g., taking into account that user's unique physiology (e.g., size and shape of the head, ears, nasal cavity, oral cavity, etc.). Alternatively, a generalized head related transfer function may be generated or selected that is applied to all users, or a plurality of generalized head related transfer functions may be generated that are applied to subsets of users (e.g., based on certain physiological characteristics that are at least loosely indicative of that user's unique head related transfer function, such as age, gender, head size, ear size, or other parameters). In one embodiment, certain aspects of the head related transfer function may be accurately determined, while other aspects are roughly approximated (e.g., accurately determines the interaural delays, but coarsely determines the magnitude response).

Figure 2:
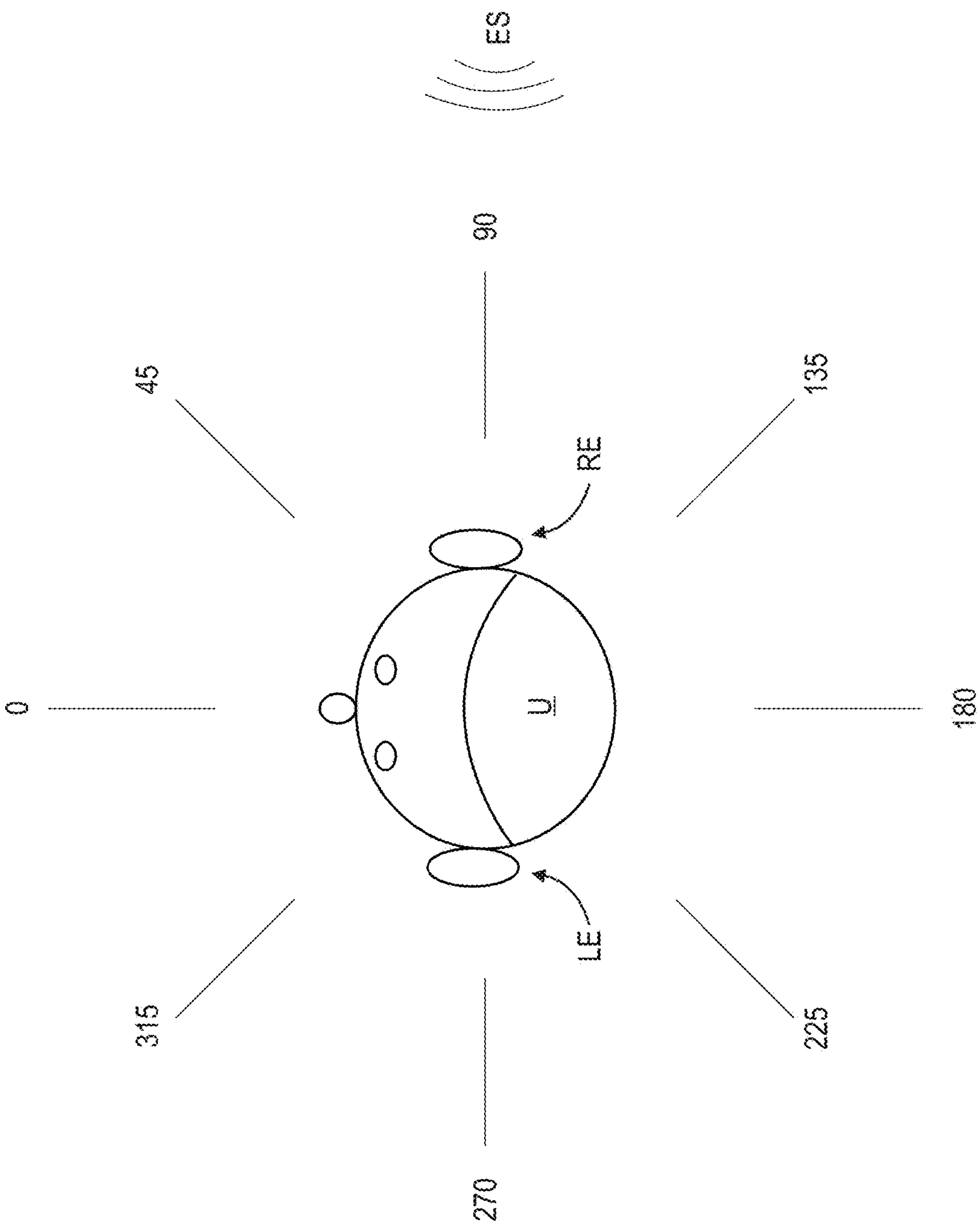
FIG. 2 illustrates environmental sound incident upon a user according to an azimuth angle.

The term "wearable audio device" as used in this disclosure, in addition to including its ordinary meaning or its meaning known to those skilled in the art, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds, or sport headphones, and can be wired or wireless. A wearable audio device includes an acoustic driver to transduce audio signals to acoustic energy. The acoustic driver can be housed in an earcup. While some of the figures and descriptions following can show a single wearable audio device, having a pair of earcups (each including an acoustic driver) it should be appreciated that a wearable audio device can be a single stand-alone unit having only one earcup. Each earcup of the wearable audio device can be connected mechanically to another earcup or headphone, for example by a headband and/or by leads that conduct audio signals to an acoustic driver in the ear cup or headphone. A wearable audio device can include components for wirelessly receiving audio signals. A wearable audio device can include components of an active noise reduction (ANR) system. Wearable audio devices can also include other functionality such as a microphone so that they can function as a headset. FIG. 2 shows an examples of an in-the-ear headphone form factor in the form of a set of wireless earbuds.

The term "augmented reality" or acronym "AR" as used herein is intended to include systems in which a user may encounter, with one or more of their senses (e.g., using their sense of sound, sight, touch, etc.), elements from the physical, real-world environment around the user that have been combined, overlaid, or otherwise augmented with one or more computer-generated elements that are perceivable to the user using the same or different sensory modalities (e.g., sound, sight, haptic feedback, etc.). The term "virtual" as used herein refers to this type of computer-generated augmentation that is produced by the systems and methods disclosed herein. In this way, a "virtual sound source" as referred to herein corresponds to a physical location in the real-world environment surrounding a user which is treated as a location from which sound is perceived to radiate, but at which no sound is actually produced by an object. In other words, the systems and methods disclosed herein may simulate a virtual sound source as if it were a real object producing a sound at the corresponding location in the real world using, based on, at least in part, HRTFs. In contrast, the term "real", such as "real object", refers to things, e.g., objects, which actually exist as physical manifestations in the real-world area or environment surrounding the user.

Figure 1:
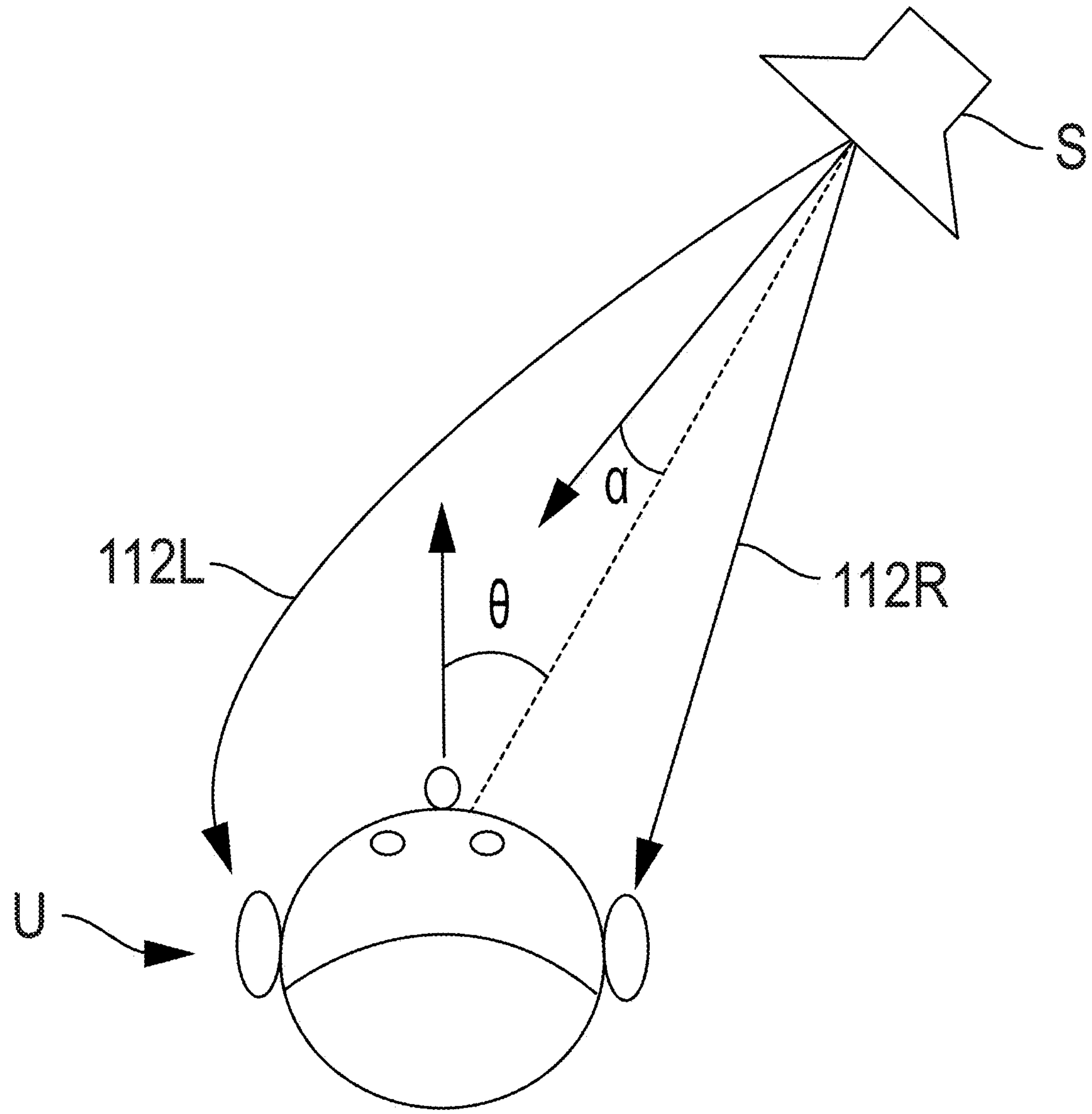
FIG. 1 is a schematic view illustrating head related transfer functions (HRTFs) characterizing sound received by a user.

The following description should be read in view of FIGS. 1-13. FIG. 1 schematically illustrates a user U receiving sound from a sound source S. As noted above, HRTFs can be calculated that characterize how the user U receives sound from the sound source, and are represented by arrows as a left HRTF 112L and a right HRTF 112R (collectively or generally HRTFs 112). The HRTFs 112 are at least partially defined based on an orientation of the user U with respect to an arriving acoustic wave emanating from the sound source, indicated by an angle θ. That is, the angle θ represents the relation between the direction that the user U is facing with respect to the direction from which the sound arrives (represented by a dashed line). A directionality of the sound produced by the sound source S may be defined by a radiation pattern, which varies with the angle α, that represents the relation between the primary (or axial) direction in which the sound source S is producing sound and the direction to which the user U is located. The HRTFs 112 of FIG. 1 are considered "generic" HRTFs 112, and are designed for a wide range of users U. While these generic HRTFs 112 may work well for most users, some users U have a head geometry or other acoustic characteristics which do not correspond to the generic HRTFs 112. For these users, sound virtualization using one or more generic HRTFs 112 may fail to provide an accurate external listening experience. In these examples, individualized HRTFs 108 may be used to adjust audio playback of the wearable audio device 100, thereby providing personalized sound virtualization.

As will be described in more detail, the present disclosure recognizes that the individualized HRTFs 108 may be determined by, in part, capturing environmental sounds ES at a right ear RE and a left ear LE of the user U. These environmental sounds ES are subsequently processed to determine individualized parameters 106 such as interaural time delay 114, head width 122 of the user U, and spectral scattering characteristics 126. The individualized parameters 106 may then be used to individualize a generic or generalized HRTF 112. Further, these determinations may be made without knowledge of the location of the sound source S prior to the user U receiving sound. Accordingly, the sound source S may be considered an "unknown source." Thus, the techniques described herein can be used with less user input and/or less user setup when the sound source S is unknown to the system prior to calculating or estimating its location. In contrast, techniques for personalizing or individualizing HRTFs that use sound sources that are at least partially known, such as techniques that generate one or more sound sources at known locations in space (e.g., having a user sweep a smartphone or other device in front of the user's head), require additional complexities and/or user input, and they are not capable of automatically adjusting to new users or automatically adjusting on-the-fly (i.e., they require an initial setup to work). Numerous other benefits of the techniques described herein will be apparent in light of this disclosure.

Figure 3:
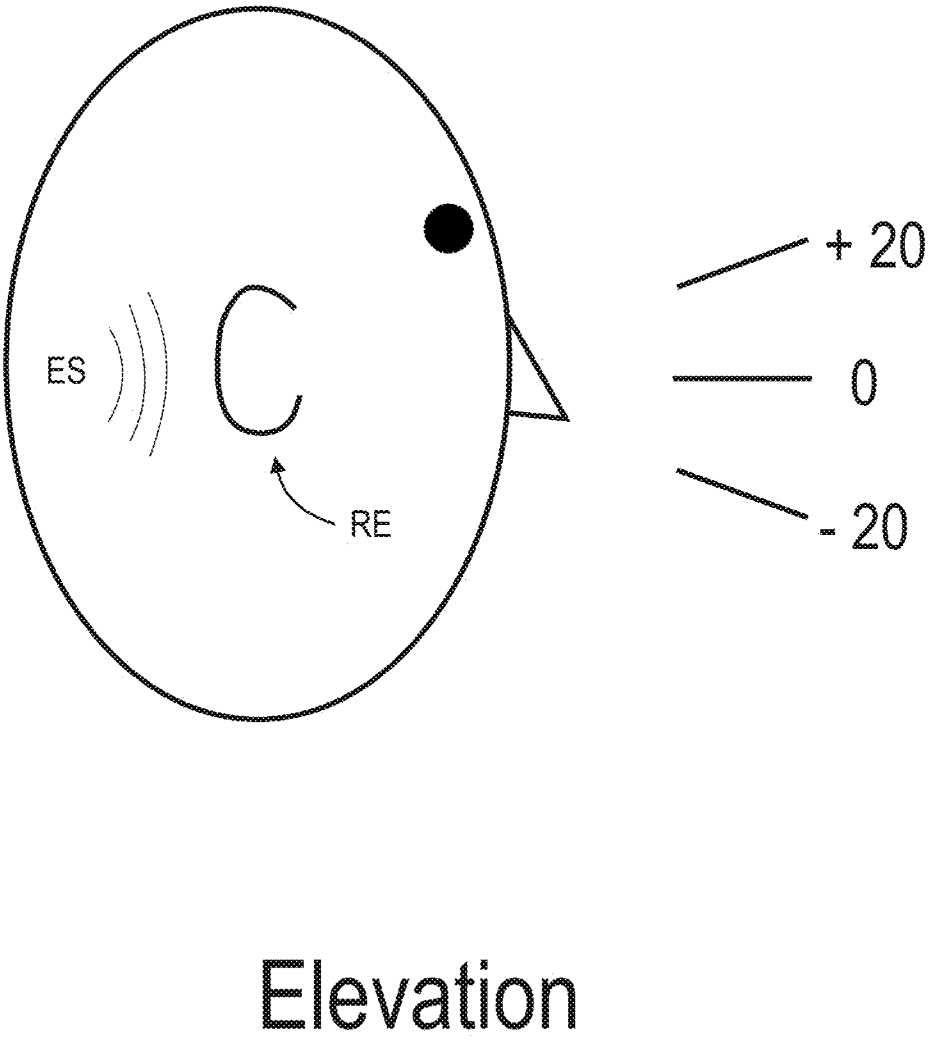
FIG. 3 illustrates environmental sound incident upon a user according to an elevational angle.

FIG. 2 illustrates a top view of a user U. More specifically, FIG. 2 illustrates an azimuth angle for environmental sound ES incident upon the user U. As shown in FIG. 2, the environmental sound ES reaches the user U at an azimuth angle of approximately 90 degrees. Similarly, FIG. 3 illustrates a side view of the user U of FIG. 2. More specifically, FIG. 3 illustrates an elevation angle for the environmental sound ES incident upon the user U. As shown in FIG. 3, the environmental sound ES reaches the user U at an elevation angle of approximately 0 degrees. Accordingly, the environmental sound ES will reach the right ear RE of the user U before the left ear LE. The difference in environmental sound ES between the right RE and the left ear LE may be analyzed to determine one or more individualized parameters 106 for the individualized HRTF 108. In particular, the difference in environmental sound ES will be maximized at the azimuth angles of 90 and 270 degrees and the elevation angle of 0 degrees. Thus, the maximized difference in environmental sound ES may be used to determine parameters 106 such as interaural time delay 114 or head width 122 without requiring prior knowledge of the source S of the environmental sound ES. Other types of individualized parameters 106, such as spectral scattering characteristics 126, may be accurately captured at any combination of values of azimuth angle and elevation angle.

Figure 4:
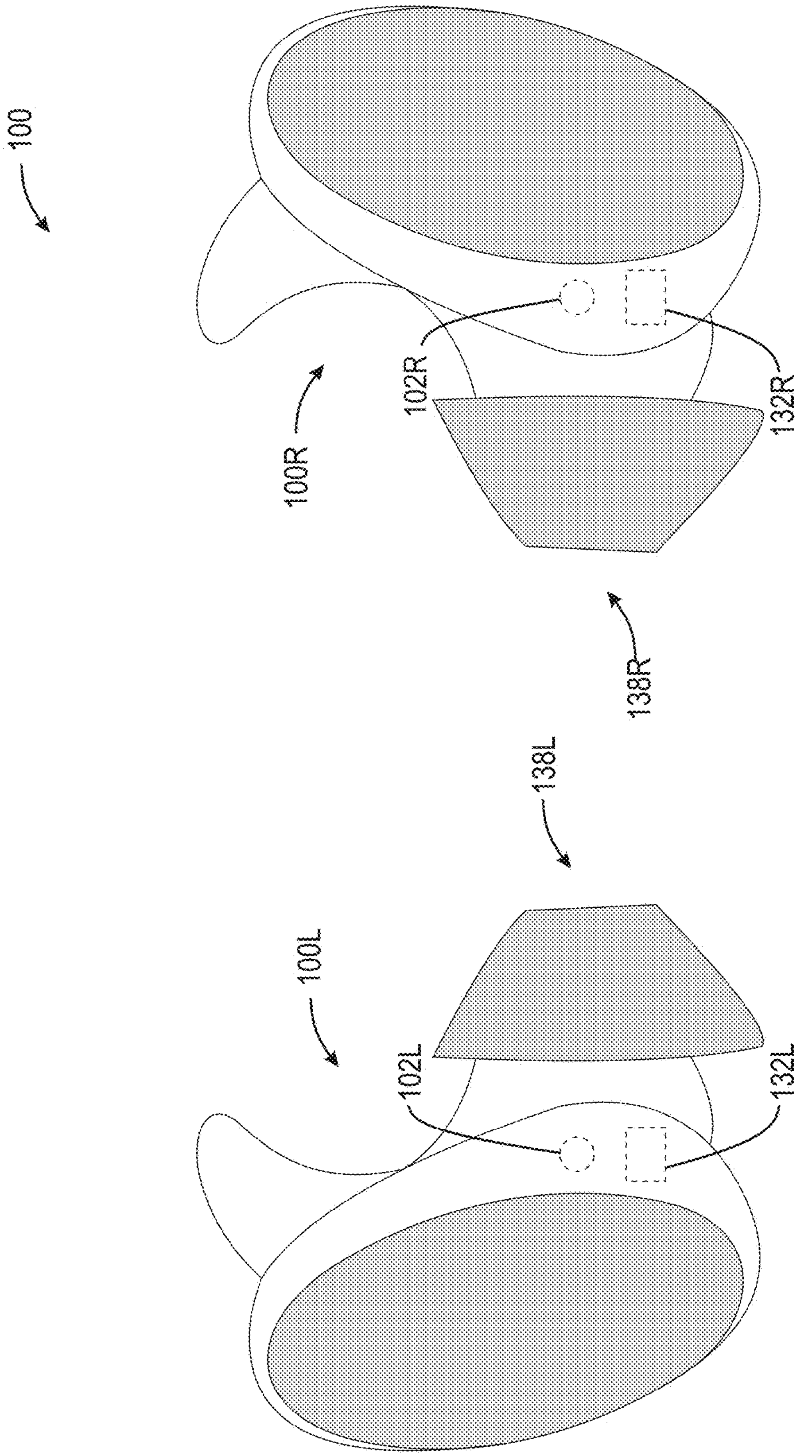
FIG. 4 illustrates a pair of wireless earbuds according to aspects of the present disclosure.
Figure 9:
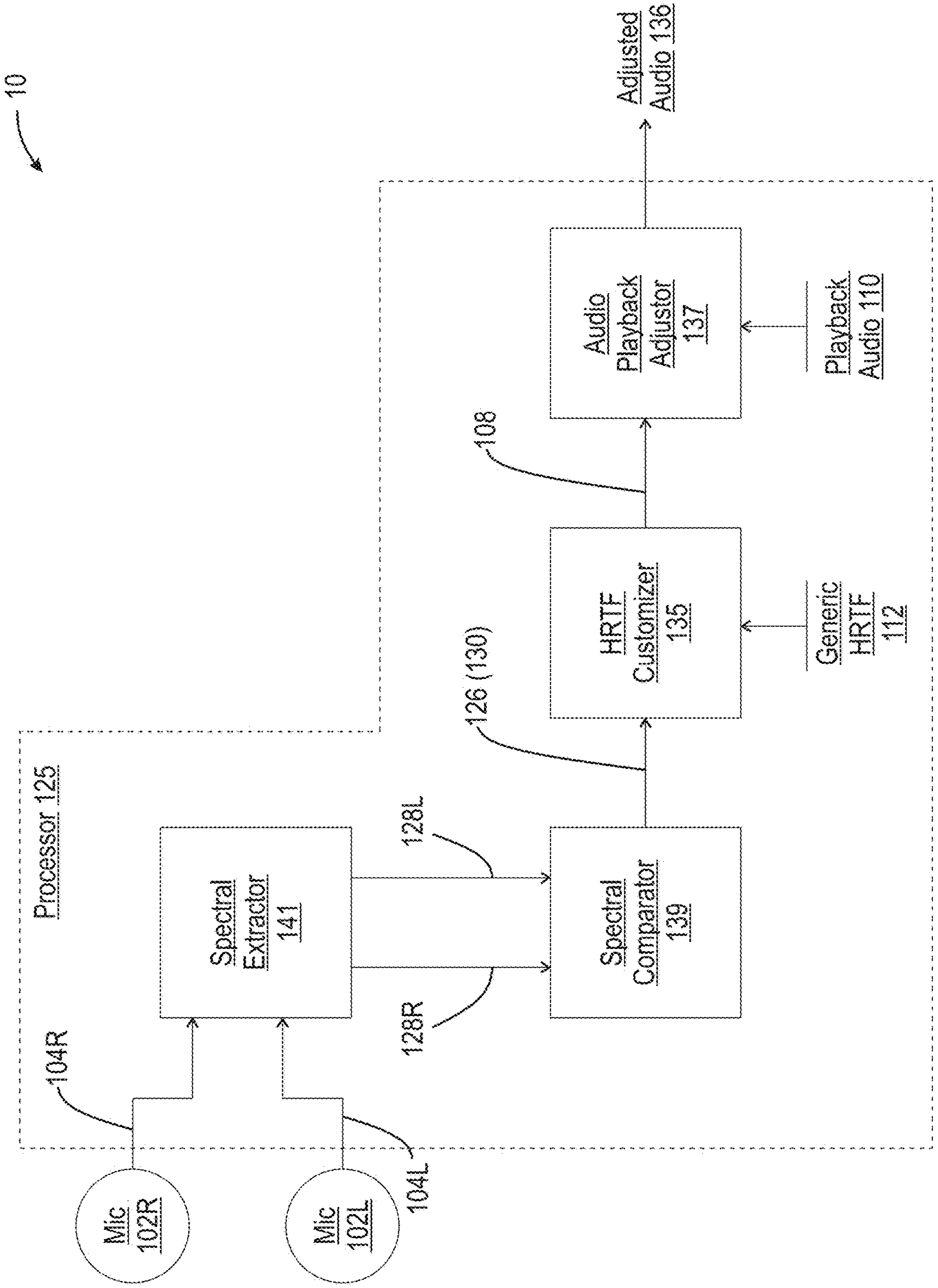
FIG. 9 is a functional block diagram illustrating the adjustment of audio according to an individualized HRTF determined based on spectral characteristics, according to aspects of the present disclosure.

FIG. 4 illustrates a wearable audio device 100 as a set of wireless earbuds 100L, 100R. A left earbud 100L is configured to be worn in the left ear LE of the user U, while a right earbud 100R is configured to be worn in the right ear RE of the user U. The left earbud 100L includes a microphone 102L, an inertial measurement unit (IMU) 132L, and an acoustic transducer 138L. Similarly, the right earbud 100R also includes a microphone 102R, an IMU 132R, and an acoustic transducer 138R. The microphones 102L, 102R may be arranged in any practical position in or on the earbuds 100L, 100R such that the microphones 102L, 102R can effectively capture the environmental sounds ES shown in FIGS. 2 and 3. Further, in some examples, the left earbud 100L and/or the right earbud 100R may include more than one microphone 102L, 102R. Similarly, the IMUs 132L, 132R are arranged in any practical position in or on the earbuds 100L, 100R to effectively capture motion data 134 indicative of the movement of the user U. The motion data 134 may include aspects such as angular velocity, angular acceleration, and/or orientation. In some examples, the motion data 134 may also include linear acceleration. Linear acceleration may enable the estimation of linear velocity and/or position. The acoustic transducers 138L, 138R are configured to generate audio for the user U to hear. As illustrated in FIG. 9, each of the wireless earbuds 100 may also include a processor 125, a memory 175, a transceiver 185, and any other components required for operating an earbud.

While the wearable audio device 100 of FIG. 4 is depicted as a set of wireless earbuds 100L, 100R, the proposed systems and methods for generating individualized HRTFs 108 may be implemented on any type of wearable audio device 100 positioned proximate to the left ear LE and right ear RE of the user U. For example, the wearable audio device 100 could be implemented as a banded set of audio headphones, a pair of hearing aids, a pair of audio eyeglasses, etc.

Figure 5:
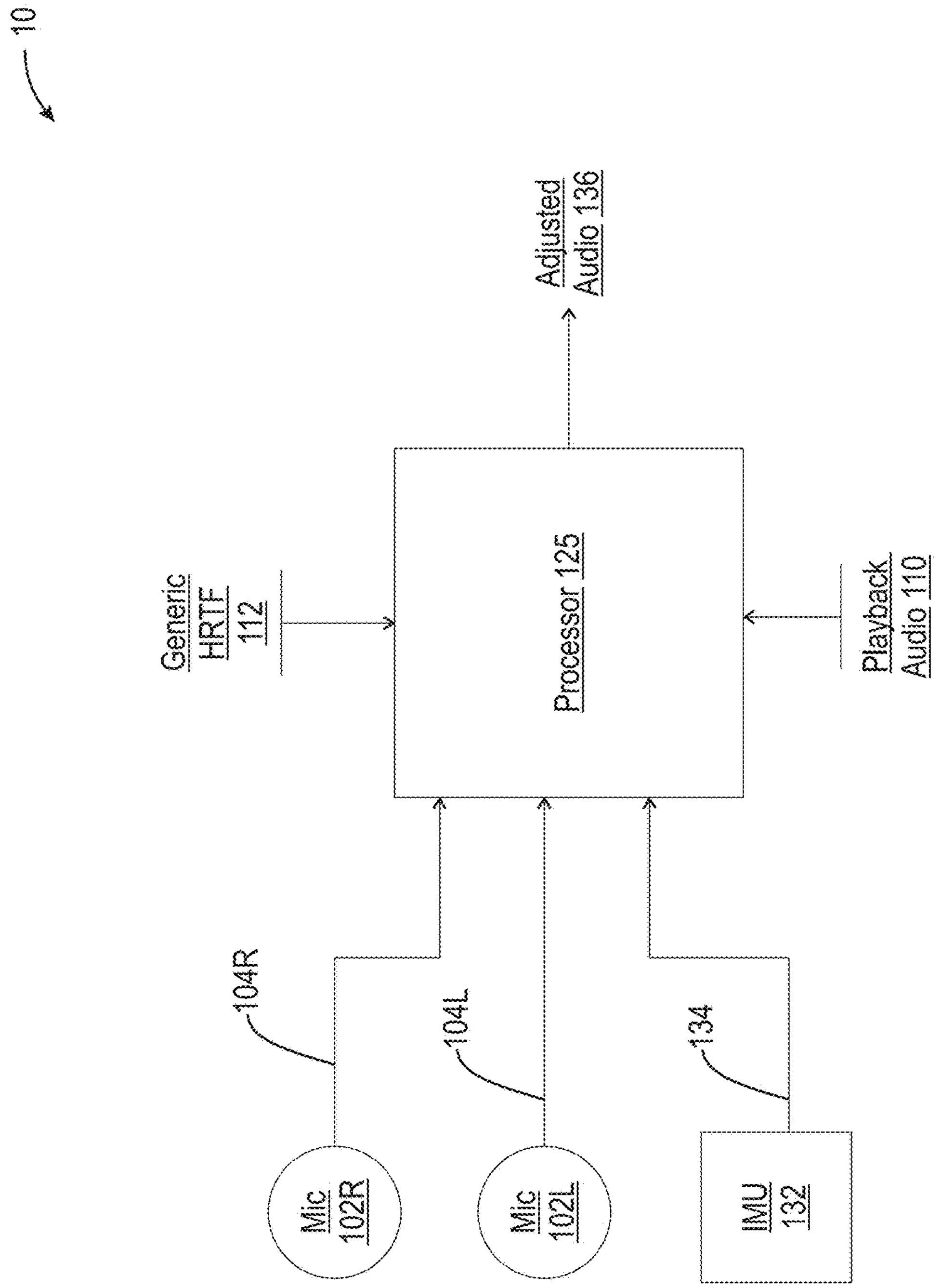
FIG. 5 is a functional block diagram illustrating the adjustment of audio according to an individualized HRTF, according to aspects of the present disclosure.

FIG. 5 illustrates a high-level functional block diagram of a personalized sound virtualization system 10. FIG. 5 illustrates the inputs required to generate adjusted audio 136 according to an individualized HRTF 108. The processor 125 shown in FIG. 5 may be arranged in either the left earbud 100L or the right earbud 100R. In some examples, the processor 125 may be arranged in an external device, such as in a smartphone or other device in wireless communication with the left earbud 100L and the right earbud 100R. In some examples, this other device may be a component of a cloud computing system connected to the left or right earbud 100L, 100R either directly or through the smartphone. Further, in some examples, the processing could be distributed, with some processing occurring within the left or right earbud 100L, 100R, and some processing occurring in the cloud or elsewhere. Similarly, the IMU 132 shown in FIG. 5 may be the IMU 132L in the left earbud 100L or the IMU 132R in the right earbud 100R.

The processor 125 is configured to receive acoustic data 104R from the right microphone 102R. If the processor 125 is arranged within the right earbud 100R, the processor 125 may receive the acoustic data 104R via internal wired connection. However, if the processor 125 is arranged externally to the right earbud 100R (such as within the left earbud 100L or another external device), the right earbud 100R may wirelessly transmit the acoustic data 104R via a transceiver 185R. Any practical type of wireless connection may be used to wirelessly transmit the acoustic data 104R to the device containing the processor 125.

The processor 125 is also configured to receive acoustic data 104L from the left microphone 102L. If the processor 125 is arranged within the left earbud 100L, the processor 125 may receive the acoustic data 104L via internal wired connection. However, if the processor 125 is arranged externally to the left earbud 100L (such as within the right earbud 100R or another external device), the left earbud

100L may wirelessly transmit the acoustic data 104L via a transceiver 185L. Any practical type of wireless connection may be used to wirelessly transmit the acoustic data 104L to the device containing the processor 125.

The processor 125 is also configured to receive motion data 134 from the IMU 132. As previously described, the IMU 132 may be arranged in either the left earbud 100L or the right earbud 100R. If the processor 125 is arranged in the same earbud 100R, 100L as the IMU 132, the processor 125 may receive the motion data 134 via internal wired connection. However, if the processor 125 and the IMU 132 are arranged in different devices, the earbud 100R, 100L comprising the IMU 132 may wirelessly transmit the motion data 134 to the device containing the processor 125. Any practical type of wireless connection may be used to wirelessly transmit the motion data 134 to the device containing the processor 125.

The processor 125 is further configured to receive a generic HRTF 112. As previously described, the generic HRTF 112 may be a HRTF suitable for most users of the wearable audio device 100. The processor 125 generates an individualized HRTF 108 according to one or more individualized parameters 106 (such as interaural time delay 114, head width 122, spectral scattering characteristics 126, etc.) corresponding to the current user U of the wearable audio device 100. The processor 125 may retrieve the generic HRTF 112 from a memory of the device comprising the processor 125. In some examples, the generic HRTF 112 may be a right side generic HRTF 112R configured for the right earbud 100R of the wearable audio device 100. In other examples, the generic HRTF 112 may be a left side generic HRTF 112L configured for the left earbud 100L of the wearable audio device 100.

The processor 125 is further configured to receive playback audio 110. The playback audio 110 represents the audio intended to be played for the user U via the acoustic transducers 138L, 138R of the wearable audio device 100. The playback audio 110 may be any type of audio such as music, an audiovisual soundtrack to a motion picture, audio corresponding to an augmented reality or virtual reality environment, telephone audio, etc. If the processor 125 is arranged in an earbud 100L, 100R, the playback audio 110 may be wirelessly transmitted to the processor 125 from the other earbud 100L, 100R or an external device (such as a mobile device, a vehicle audio system, a wireless-enabled audio receiver, etc.). In some examples, this wireless transmission may be a Bluetooth transmission.

Upon receiving the playback audio 110, the processor 125 adjusts the playback audio 110 according to the individualized HRTF 108 to generate adjusted audio 136. The adjusted audio 136 is played back for the user via the acoustic transducers 138L, 138R of the wearable audio device 100. As described with respect to FIG. 1, applying the individualized HRTF 108 to the playback audio 110 results in adjusted audio 136 which sounds as if it was generated by an external source, rather than the acoustic transducers 138L, 138R arranged within the ears LE, RE of the user U. Further, because the playback audio 110 is adjusted according to the individualized HRTF 108, the adjusted audio 136 is customized specifically for the user U.

In some examples, the functions of the processor 125 described above may be distributed across multiple processors, such as multiple digital signal processors, ARM cores, etc. For example, one set of processors may be used to generate the individualized HRTF 108, while another set of processors may be used to adjust the playback audio 110.

Figure 6:
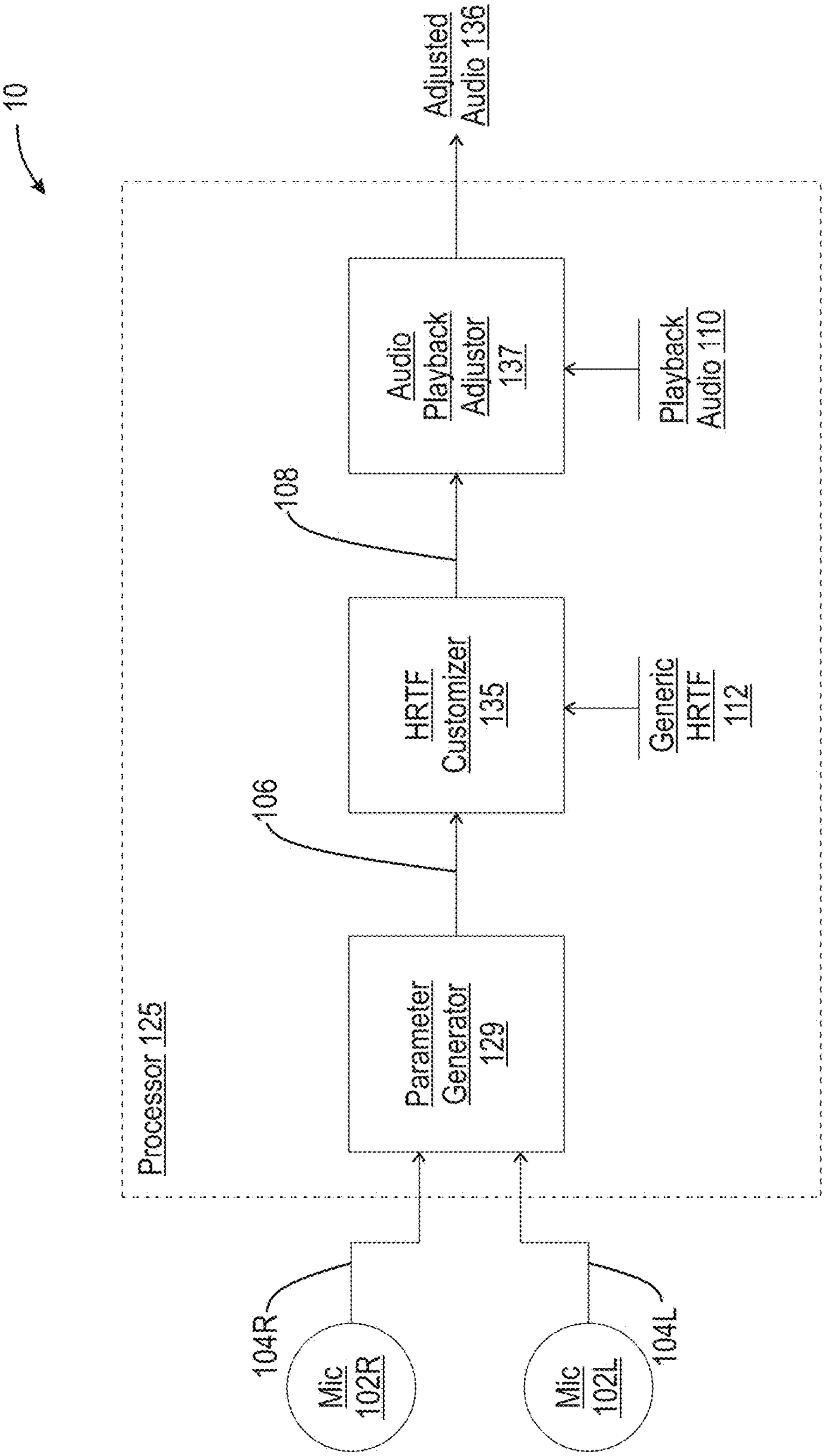
FIG. 6 is a further functional block diagram illustrating the adjustment of audio according to an individualized HRTF, according to aspects of the present disclosure.

FIG. 6 is a functional block diagram of a personalized sound virtualization system 10. FIG. 6 generally illustrates the adjustment of playback audio 110 according to an individualized HRTF 108. As shown in FIG. 6, the microphone 102R of the right earbud RE generates right-side acoustic data 104R based on captured environmental sound ES. Similarly, the microphone 102L of the left earbud LE generates left-side acoustic data 104L based on captured environmental sound ES. The acoustic data 104R, 104L generated by the microphones 102R, 102L may be a time series of audio data collected over a predetermined time period. The predetermined time period may be a period of several seconds, such as less than ten seconds.

A parameter generator 129 receives the acoustic data 104R, 104L captured by the microphones 102R, 102L. As will be described in greater detail with reference to subsequent figures, the parameter generator 129 processes the acoustic data 104R, 104L to generate one or more individualized parameters 106 specific to the user U of the wearable audio device 100. The individualized parameters 106 may include interaural time delay 114, head width 122, and/or spectral scattering characteristics 126.

The individualized parameters 106 are provided to an HRTF customizer 135. The HRTF customizer is configured to adjust a generic HRTF 112 according to the individualized parameters 106, resulting in an individualized HRTF 108 customized for the user U wearing the wearable audio device 100.

The individualized HRTF 108 is provided to an audio playback adjustor 137. The audio playback adjustor 137 is configured to adjust the playback audio 110 according to the individualized HRTF 108, thereby generating adjusted audio 136 customized for the user U. Using the individualized HRTF 108, the audio playback adjustor 137 generates adjusted audio 136 which sounds as if it was generated by an external source, rather than the acoustic transducers 138L, 138R of the wearable audio device 100 arranged within the ears LE, RE of the user U.

Figure 7:
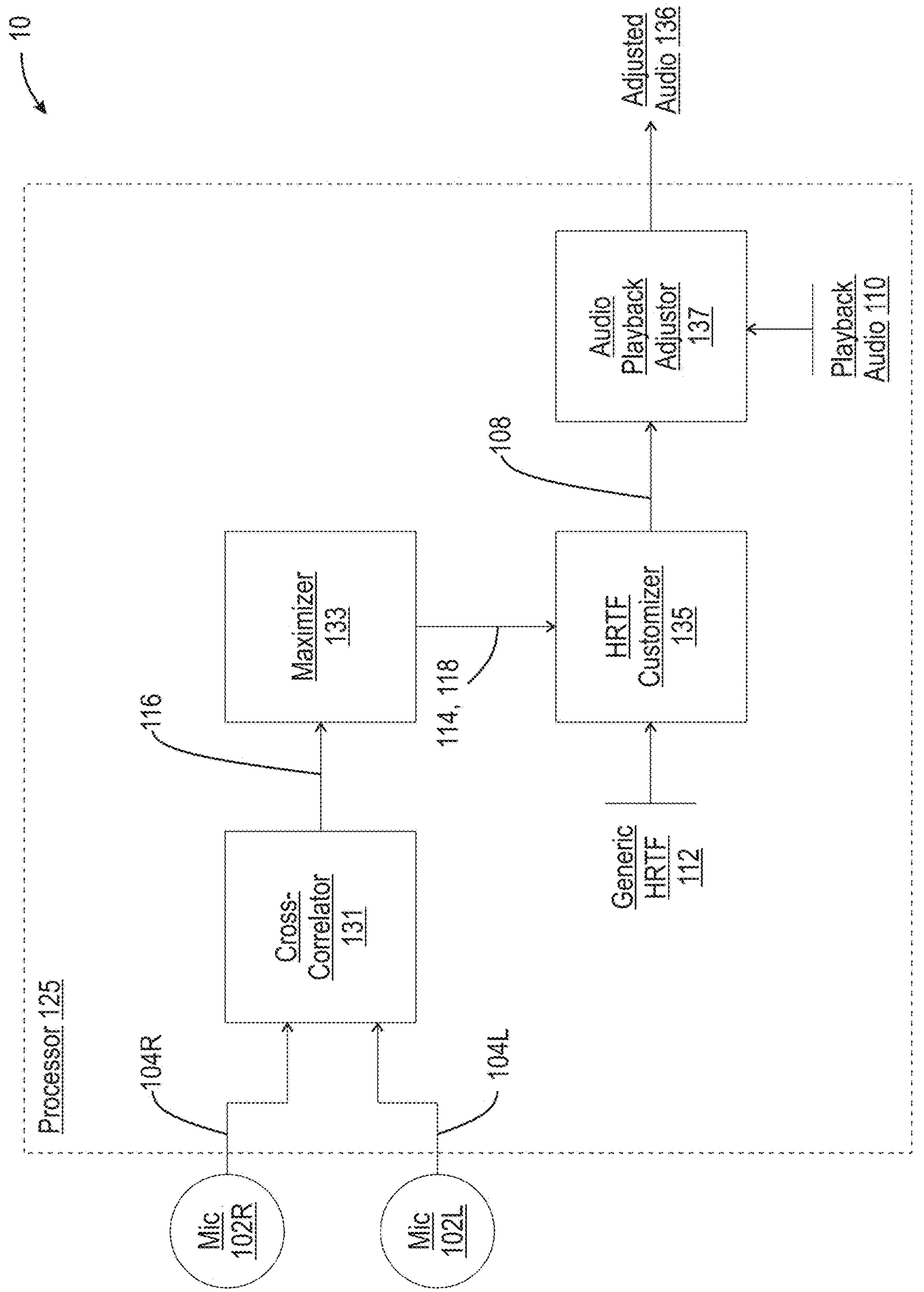
FIG. 7 is a functional block diagram illustrating the adjustment of audio according to an individualized HRTF determined based on interaural time delay, according to aspects of the present disclosure.

FIG. 7 illustrates a variation of the block diagram of FIG. 6. In this variation, the generic HRTF 112 is adjusted according to an interaural time delay 114 corresponding to the user U. Like the individualized parameters 106 of FIG. 6, the interaural time delay 114 is determined based on the acoustic data 104R, 104L captured by the right and left microphones 104R, 104L of the wearable audio device 100. The generalized parameter generator 106 of FIG. 6 is replaced with a cross-correlator 131 and a maximizer 133.

In FIG. 7, the microphones 102R, 102L provide the cross-correlator 131 with the acoustic data 102R, 102L from each ear RE, LE of the user U. The cross-correlator 131 is configured to perform a cross-correlation operation on the acoustic data 102R, 102L to determine time delay data 116. The time delay data 116 represents the amount of time required for sound to travel from one ear of the user to the other.

The time delay data 116 is then provided to a maximizer 133. The maximizer 133 analyzes the time delay data 116 over the predetermined time period to find a maximum value 118, which is the value of the interaural time delay 114. The time delay data 116 will have a maximum value 118 when the environmental sound ES reaches the user U at an azimuth angle of 90 degrees or 270 degrees (as shown in FIG. 2) and an elevation angle of 0 degrees (as shown in FIG. 3). Thus, the predetermined time period may be used to ensure a maximum value 118 is captured as part of the time delay data 116.

In some examples, the wearable audio device 100 may be used to initiate an individualized HRTF calibration procedure. As part of this procedure, an external device, such as a mobile device, may be used as the source of the environmental sound ES. As part of the calibration procedure, the user U may position the mobile device at various locations around the wearable audio device 100 during the predetermined time period. In particular, the user U may hold the mobile device at an azimuth angle of 90 or 270 degrees and an elevation angle of 0 degrees to capture the maximum value 118 of the time delay data 116.

The interaural time delay 114 is then provided to the HRTF customizer 135. The HRTF customizer generates an individualized HRTF 108 by adjusting the generic HRTF 112 according to the interaural time delay 114. The audio playback adjustor 137 then uses the individualized HRTF 108 to adjust playback audio 110, resulting in adjusted audio 136 to be played back to the user U.

Figure 8:
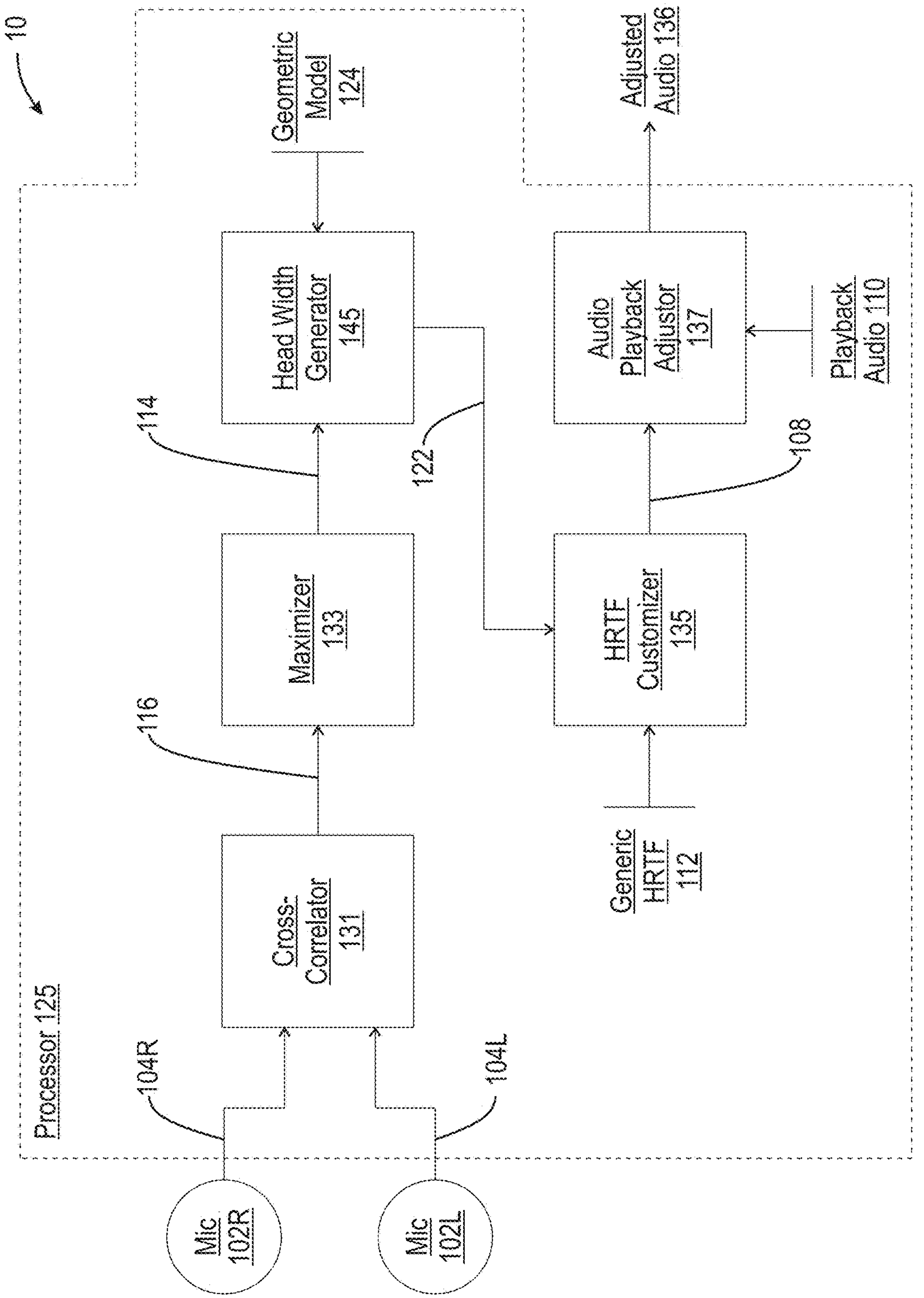
FIG. 8 is a functional block diagram illustrating the adjustment of audio according to an individualized HRTF determined based on interaural time delay and head width, according to aspects of the present disclosure.

In further examples, the interaural time delay 114 may be processed to determine a head width 122 of the user U. As shown in FIG. 8, the interaural time delay 114 is provided to a head width generator 145. The head width generator 145 also receives a geometric model 124 of the wearable audio device 124 and a head of the user U, which includes the position of the right and left microphones 102R, 102L used to capture the environment sound ES. The head width generator 145 uses the interaural time delay 114 and the geometric model 124 to calculate the head width 122 of the user U. The head width 122 may then be provided to HRTF customizer 135 to calibrate the individualized HRTF 108.

FIG. 9 illustrates a variation of the block diagram of FIG. 6. In this variation, the generic HRTF 112 is adjusted according to spectral scattering characteristics 126 corresponding to the user U. The spectral scattering characteristics 126 may represent acoustic shadowing occurring as sound passes around the head of the user U. For instance, when environmental sound ES passes around the head of the user U, high frequency portions of the environmental sound ES may be filtered out by the physical properties of the head, while lower frequency portions remain. In some examples, the spectral scattering characteristics 126 may define an interaural level difference (ILD) between the ears LE, RE of the user U over a range of frequencies. Like the individualized parameters 106 of FIG. 6, the spectral scattering characteristics 126 are determined based on the acoustic data 104R, 104L captured by the right and left microphone 104R, 104L of the wearable audio device 100. The generalized parameter generator 106 of FIG. 6 is replaced with a spectral extractor 141 and a spectral comparator 139.

The spectral extractor 141 receives the acoustic data 104R, 104L from the right and left microphones 102R, 102L. The spectral extractor 141 derives frequency spectrum characteristics from the acoustic data 104R, 104L as right spectral data 128R (corresponding to the acoustic data 104R from the right microphone 102R) and left spectral data (corresponding to the acoustic data 104L from the left microphone 102L). The right and left spectral data 128R, 128L is provided to the spectral comparator 139. The spectral comparator 139 processes the right and left spectral data 128R, 128L (such as by comparing corresponding time windows of the right and left spectral data 128R, 128L) to generate the spectral scattering characteristics 126. In some examples, the spectral scattering characteristics 126 may include a maximum spectral difference 130 between the right spectral data 128R and the left spectral data 128L. The spectral scattering characteristics 126 are then provided to the HRTF customizer 135 to generate an individualized HRTF 108.

Figure 10:
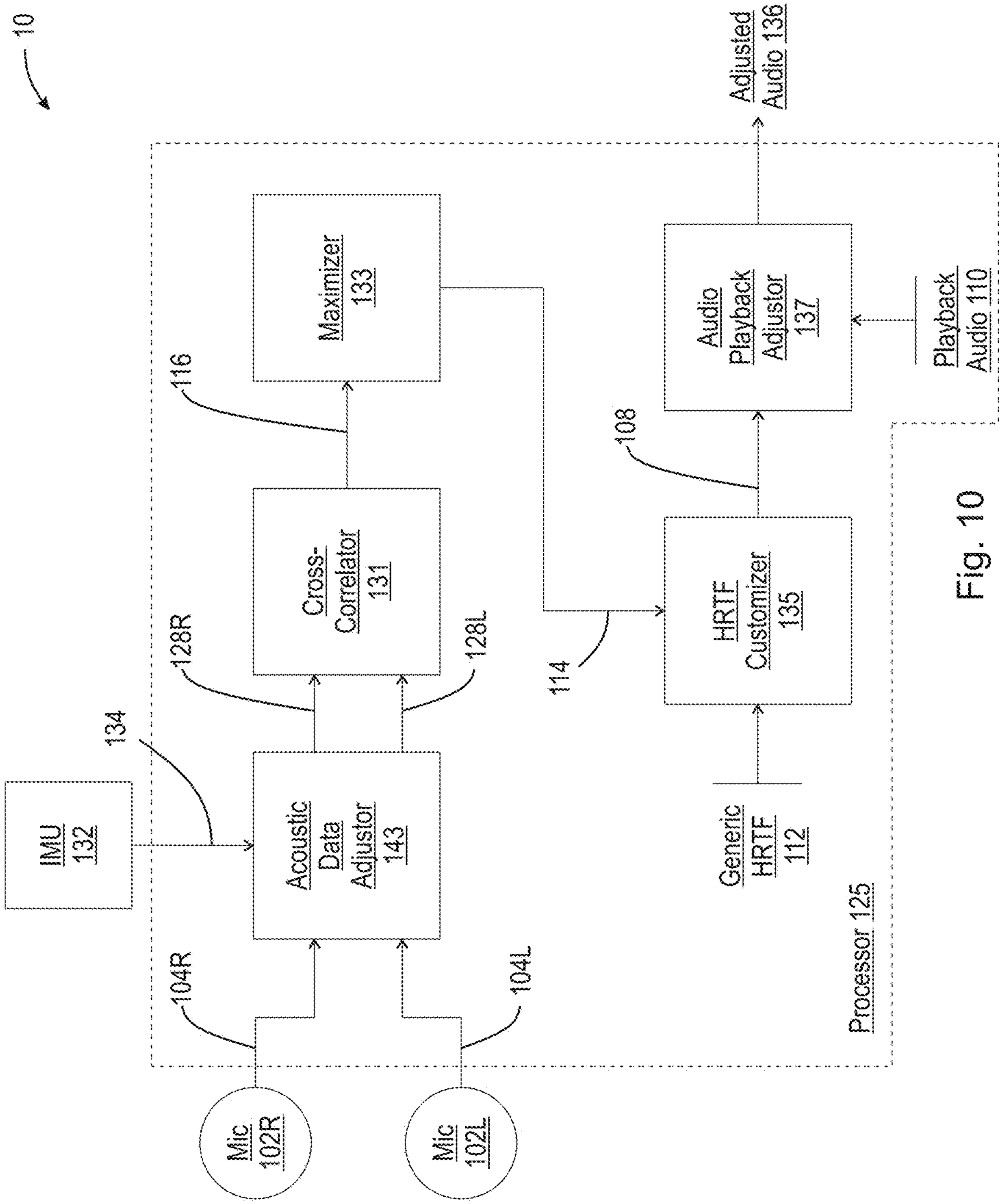
FIG. 10 is a variation of the block diagram of FIG. 7 wherein acoustic data is adjusted based on motion data captured by an inertial measurement unit, according to aspects of the present disclosure.

FIG. 10 illustrates a variation of the block diagram of FIG. 7. In this variation, an IMU 132 is used to capture motion data 134 corresponding to head movement of the user U. The IMU 132 may be embedded in either the right earbud 102R or the left earbud 102L, as both earbuds 102R, 102L should move in the same manner when the head of the user U moves. The motion data 134 is used to correct for head movements or other movement of the wearable audio device 100 while the acoustic data 104R, 104L is being captured by the microphones 102R, 102L.

In the example of FIG. 10, an acoustic data adjustor 143 receives the motion data 134 from the IMU 132 along with acoustic data 104R, 104L from the microphones 102R, 102L. The acoustic data adjustor 143 calibrates the acoustic data 104R, 104L based on the motion data 134, resulting in motion-adjusted acoustic data 138R, 138L. The motion-adjusted acoustic data 138R, 138L is then provided to the cross-correlator 131 and the maximizer 133 to determine the interaural time delay 114 as previously discussed with respect to FIG. 7.

In further examples, the motion data 134 captured by the IMU 132 may be used with the acoustic data 104R, 104L captured by the microphones 102R, 102L to determine the location of an external source of the environmental sound ES. Prior to performing this determination, the location of the external source is unknown. In the previous examples, the optimum location of the external source for determining the interaural time delay 114 was at an azimuth angle of 90 or 270 degrees and an elevation angle of 0 degrees. However, data collected from environmental sound ES generated by external sources at locations other than the optimum location may also be useful to generate the individualized HRTF 108, even if the collected data is not maximized, particularly when paired with source location data. In these further examples, the motion data 134 may be used to generate an initial course estimate of the location of the external source. This estimated location may then be refined via adaptive filtering or other processing, such as by comparing the estimated location to a source location value derived from the generic HRTF 112. The refined source location may then be used to translate either the acoustic data 104R, 104L captured by the microphones 102R, 102L or the individualized parameters 106 generated by the processor 125 to correspond to the optimized location, allowing for the individualized parameters 106 to be calculated even if the external source is not positioned at an azimuth angle of 90 or 270 degrees and an elevation angle of 0 degrees. Enabling the evaluation of the individualized parameters 106 of the individualized HRTF 108 at any combination of azimuth and elevation angles allows for more efficient calculation of the individualized parameters 106. Further, this technique may also be used to collect additional data (including, but not necessarily limited to, data related to the individualized parameters 106) at various locations (other than simply an azimuth angle of 90 or 270 degrees and an elevation angle of 0 degrees) to create a virtual "map" of HRTF-related data around the head of the user U. This data of this virtual map may be used to further refine the individualized HRTF 108 for the user U. In other examples, aspects of the motion data 134 captured by the IMU 132 may be used to stabilize spectral scattering characteristics 126. For example, linear velocity and position, derived from linear acceleration, may be particularly useful in this regard.

The techniques for personalized sound virtualization described with respect to the previous figures may be performed automatically, such as without any additional user input. The level of automation could differ based on the particular implementation. For example, in some embodiments, the user U could be required to enable the techniques via, e.g., companion software such as a companion mobile application. This mobile application could be accessed via a peripheral device (such as a smartphone) in wireless communication with the wearable audio device 100. In other embodiments, the techniques could be a component of providing a spatialized audio experience such that they are automatically performed when the spatialized audio experience is delivered. In some embodiments, the techniques can be linked to a user U such that they are only performed once unless there is an indication (e.g., manual input or automatic detection) that a new user U is using the wearable audio device 100, and when such an indication is provided, then the techniques could be performed again for that new user U to individualize their spatial audio listening experience.

Figure 11:
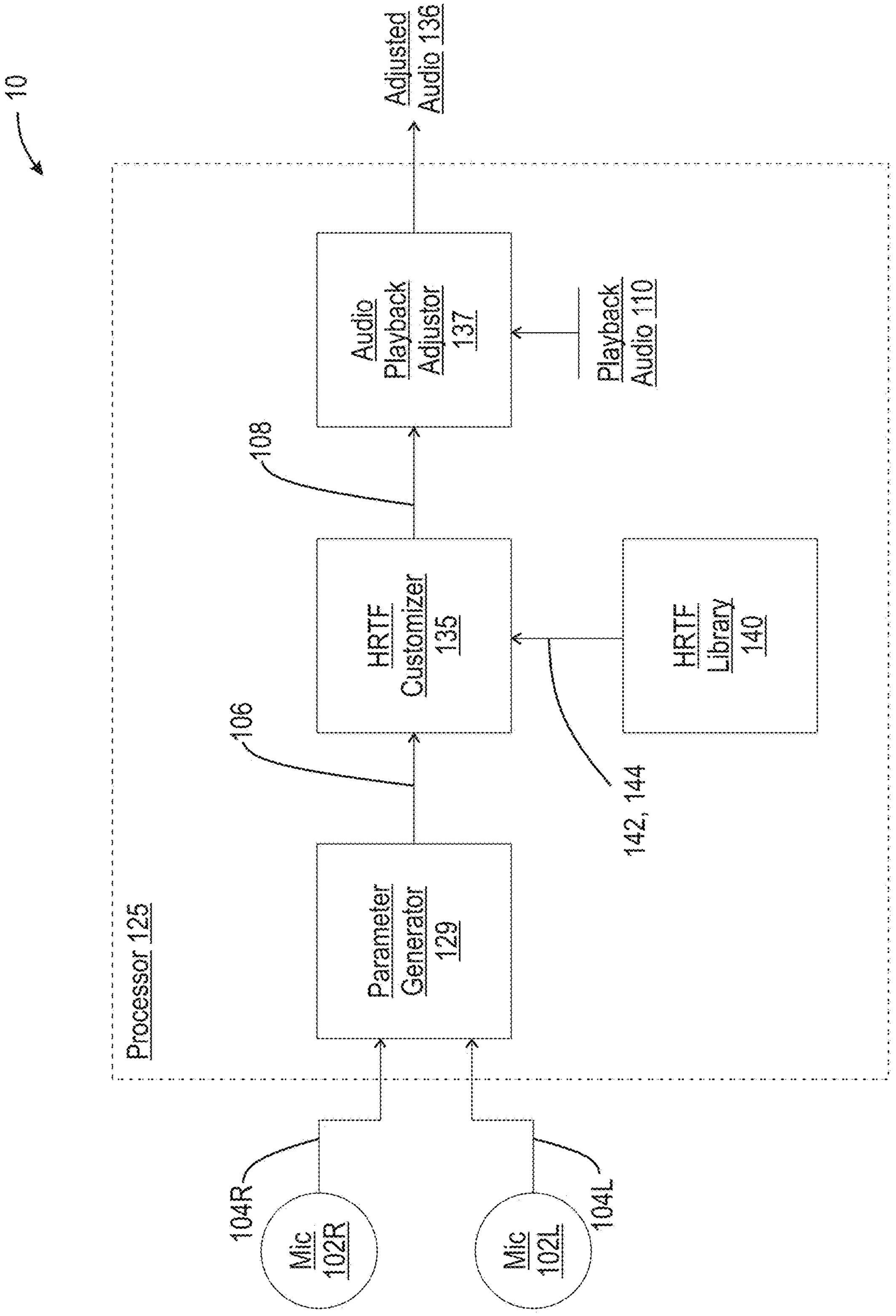
FIG. 11 is a variation of the block diagram of FIG. 6 wherein the individualized HRTF is retrieved from an HRTF library, according to aspects of the present disclosure.

FIG. 11 illustrates a variation of the block diagram of FIG. 6. In this variation, the HRTF customizer 135 retrieves the individualized HRTF 108 from an HRTF library 140 based on the individualized parameters 106, rather than generating the individualized HRTF 108 by adjusting a generic HRTF 112. In these examples, the HRTF library 140 may be stored in a memory 175 of the wearable audio device 100. In other examples, the HRTF library 140 may be stored on an external device, such as a smartphone, or in the cloud. The HRTF library 140 may include a set of stored HRTFs 142 linked to various stored parameters 144. The stored parameters 144 may include values for interaural time delay, head width, or spectral scattering characteristics. For example, if the user U is determined to have a certain head width, a stored HRTF 142 corresponding to the certain head width may be retrieved from the HRTF library 140. The retrieved HRTF 142 is then used as the individualized HRTF 108 to generate the adjusted audio 136 to play back for the user U. In some examples, more than one individualized parameter 106 (such as both head width and spectral scattering parameters) may be used to retrieve a stored HRTF 142 from the HRTF library 140. The stored HRTFs 142 may be linked to the stored parameters 144 based on a combination of observed data and/or simulated data.

Figure 12A:
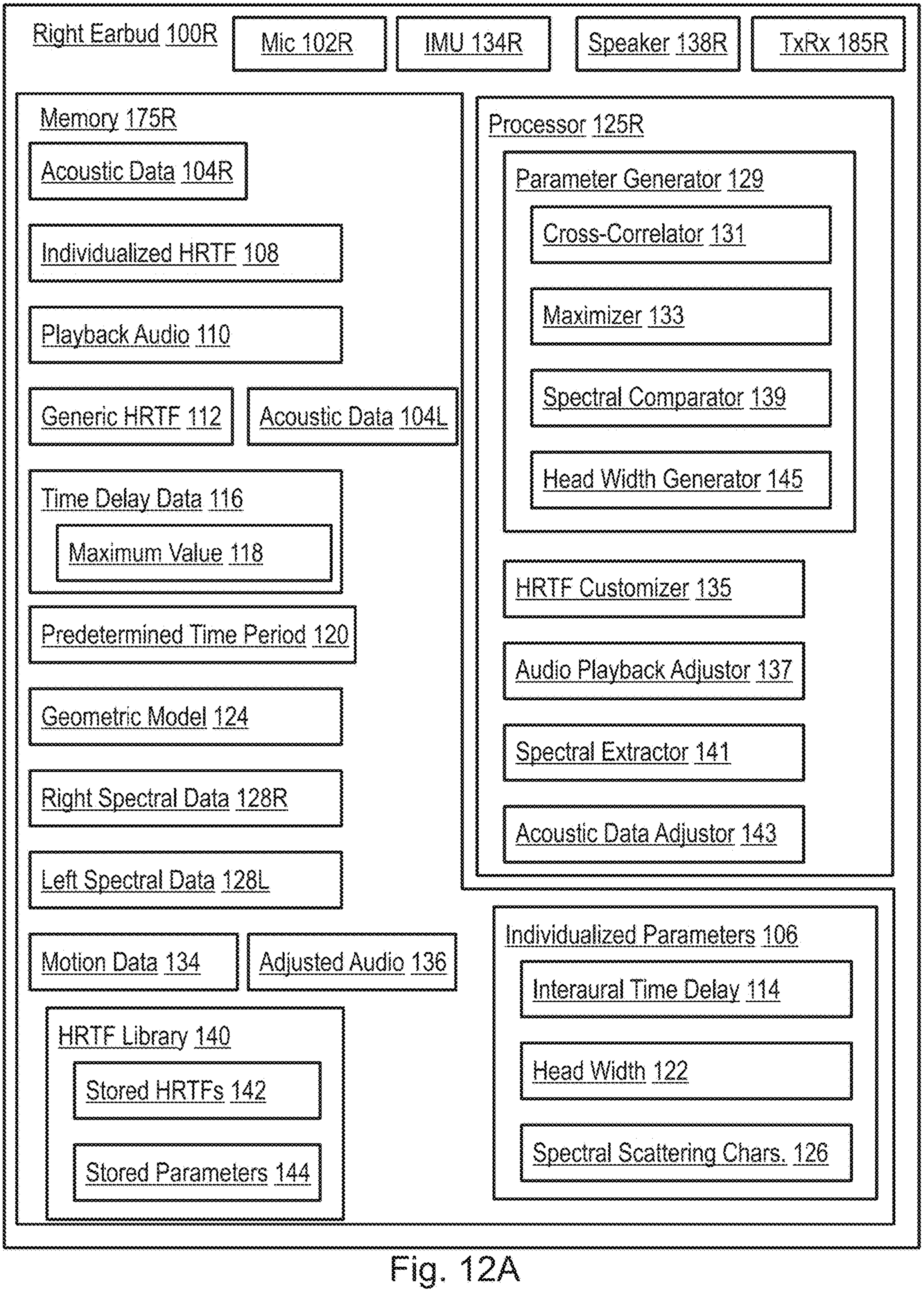
FIG. 12A is a schematic of a right earbud of a wearable audio device according to aspects of the present disclosure.

FIG. 12A illustrates a schematic of the right earbud 100R of the wearable audio device 100. Broadly, the right earbud 100R includes a microphone 102R, a processor 125R, an IMU 134R, an acoustic transducer (speaker) 138R, a memory 175R, and a transceiver 185R. The processor 125R of the right earbud 100R may be configured to execute the parameter generator 129, the HRTF customizer 135, the audio playback adjustor 137, the spectral extractor 141, and the acoustic data adjustor 143. The parameter generator 129 may include the cross-correlator 131, the maximizer 133, the spectral comparator 139, and the head width generator 145. The memory 175R of the right earbud 100R may store a wide array of data, including the acoustic data 104R, 104L, the individualized parameters 106, the individualized HRTF 108, the playback audio 110, the generic HRTF 112, the time delay data 116 (including the maximum value 118), the predetermined time period 120, the geometric model 124, the spectral data 128R, 128L, the motion data 134, the adjusted audio 136, and the HRTF library 140 (including stored HRTFs 142 and stored parameters 144). The individualized parameters 106 may include the interaural time delay 114, the head width 122, and the spectral scattering characteristics 126. In this example, the right earbud 100R may be configured to perform all aspects of the personalized sound virtualization system 10 described with respect to the previous figures. Further, the right earbud 100R receives the left acoustic data 104L from the left earbud 100L via a wireless connection facilitated by the transceiver 185R.

Figure 12B:
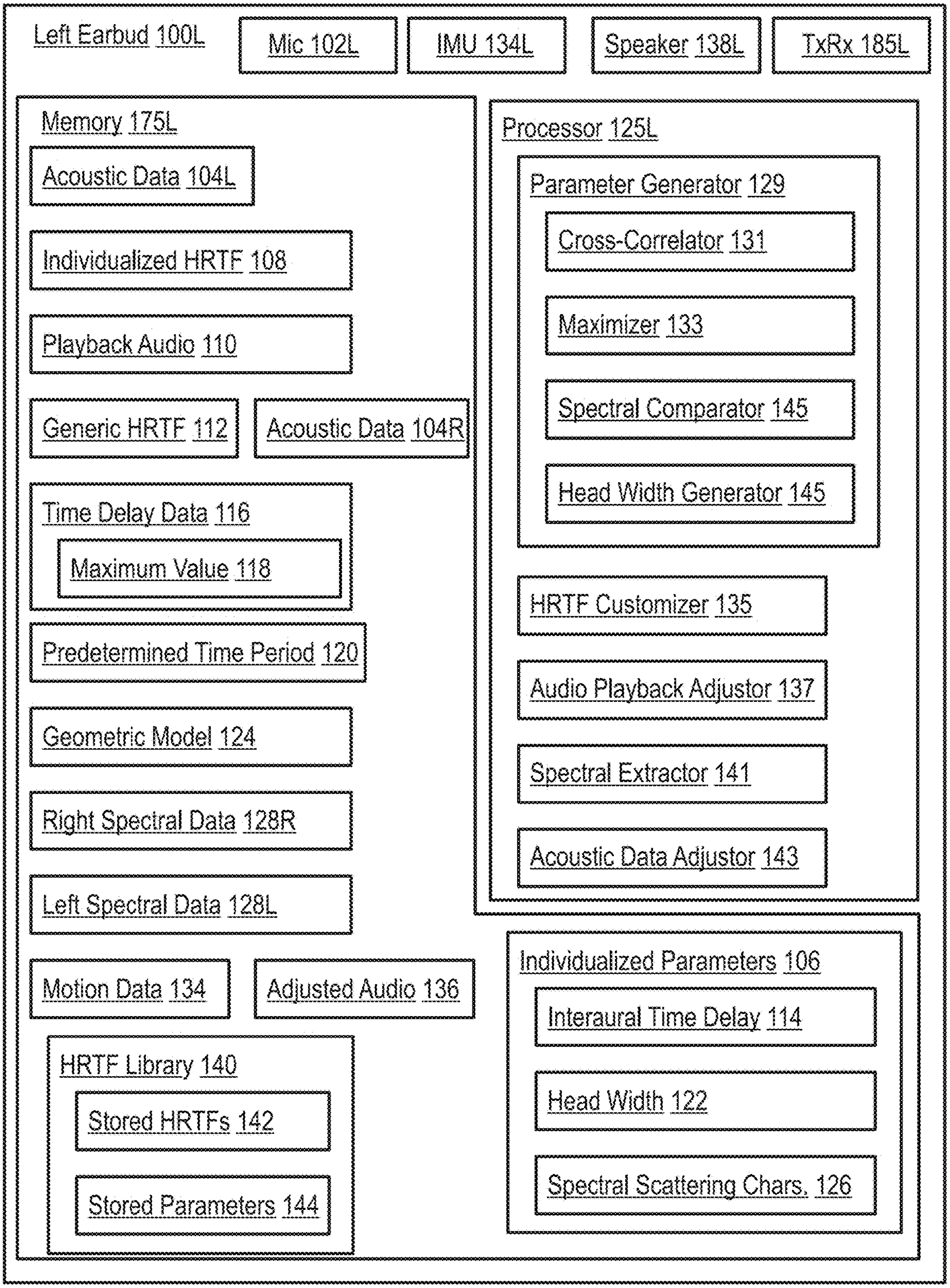
FIG. 12B is a schematic of a left earbud of a wearable audio device according to aspects of the present disclosure.

FIG. 12B illustrates a schematic of the left earbud 100L of the wearable audio device 100. Broadly, the left earbud 100L includes a microphone 102L, a processor 125L, an IMU 134L, an acoustic transducer (speaker) 138L, a memory 175L, and a transceiver 185L. The processor 125L of the right earbud 100R may be configured to execute the parameter generator 129, the HRTF customizer 135, the audio playback adjustor 137, the spectral extractor 141, and the acoustic data adjustor 143. The parameter generator 129 may include the cross-correlator 131, the maximizer 133, the spectral comparator 139, and the head width generator 145. The memory 175L of the right earbud 100R may store a wide array of data, including the acoustic data 104R, 104L, the individualized parameters 106, the individualized HRTF 108, the playback audio 110, the generic HRTF 112, the time delay data 116 (including the maximum value 118), the predetermined time period 120, the geometric model 124, the spectral data 128R, 128L, the motion data 134, the adjusted audio 136, and the HRTF library 140 (including stored HRTFs 142 and stored parameters 144). The individualized parameters 106 may include the interaural time delay 114, the head width 122, and the spectral scattering characteristics 126. In this example, the left earbud 100L may be configured to perform all aspects of the personalized sound virtualization system 10 described with respect to the previous figures. Further, the left earbud 100L receives the right acoustic data 104R from right earbud 100R via a wireless connection facilitated by the transceiver 185L.

Figure 13:
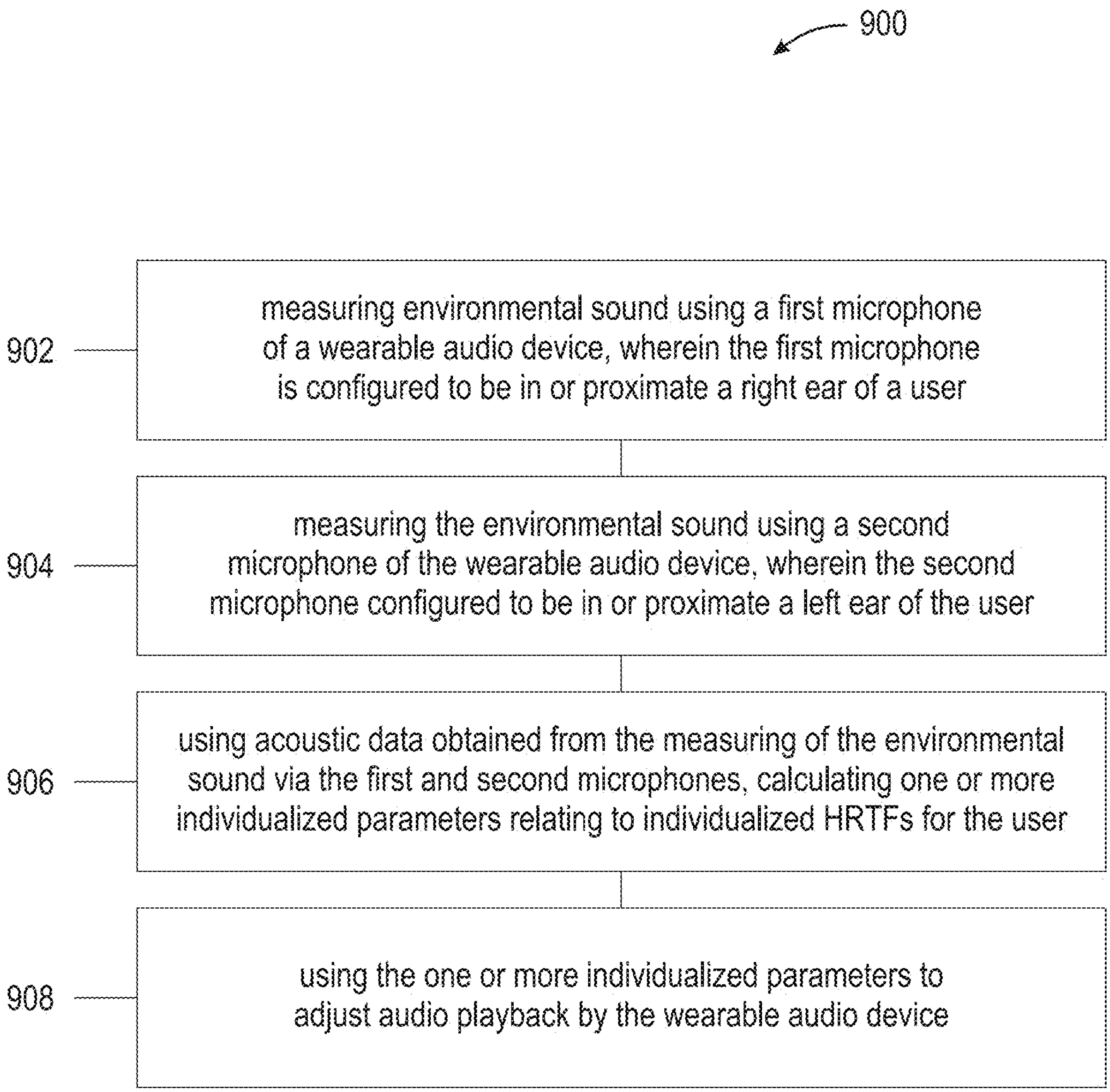
FIG. 13 illustrates the steps of a method according to aspects of the present disclosure.

FIG. 13 is a flowchart of a method 900 for personalized sound virtualization. The method 900 includes measuring environmental sound ES using a first microphone 102R of a wearable audio device 100. The first microphone 102R is configured to be in or proximate to a right ear RE of a user U.

The method 900 further includes measuring the environmental sound ES using a second microphone 102L of the wearable audio device 100. The second microphone 102L is configured to be in or proximate to a left ear LE of the user U.

The method 900 further includes using acoustic data 104R, 104L obtained from the measuring of the environmental sound ES via the first and second microphones 102R, 102L, calculating one or more individualized parameters 106 relating to individualized HRTFs 108 for the user U.

The method 900 further includes using the one or more individualized parameters 106 to adjust audio playback 110 by the wearable audio device 100. According to an example, the audio playback 110 is adjusted at least partially based on an individualized HRTF 108. The individualized HRTF 108 may be generated by adjusting a generic HRTF 112 according to the one or more individualized parameters 106.

According to an example, the one or more individualized parameters 106 includes an interaural time delay 114. The interaural time delay 114 may be determined by: (1) determining time delay data 116 by cross correlating the acoustic data 104R corresponding to the first microphone 102R with the acoustic data 104L corresponding to the second microphone 102L; and (2) determining a maximum value 118 of the time delay data 116, wherein the maximum value 118 of the time delay data 116 is determined over a predetermined time period 120. According to an example, the one or more individualized parameters 106 further include a head width 122 of the user U. The head width 122 is determined based on the interaural time delay 114 and a geometric model 124 of the wearable audio device 100.

According to an example, the one or more individualized parameters 106 includes spectral scattering characteristics 126. The spectral scattering characteristics 126 may be determined by: (1) deriving first spectral data 128R from the acoustic data 104R captured by the first microphone 102R; (2) deriving second spectral data 128L from the acoustic data 104L captured by the second microphone 102L; and (3) comparing the first spectral data 128R to the second spectral data 128R. The spectral scattering characteristics 126 may include a maximum spectral difference 130 between the first spectral data 128R and the second spectral data 128L.

According to an example, the acoustic data 104R, 104L may be adjusted based on motion data 134 captured by an IMU 132 of the wearable audio device 100.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software, or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for personalized sound virtualization, comprising:

measuring environmental sound using a first microphone of a wearable audio device, wherein the first microphone is configured to be in or proximate to a right ear of a user;

measuring the environmental sound using a second microphone of the wearable audio device, wherein the second microphone is configured to be in or proximate to a left ear of the user;

capturing motion data using an inertial measurement unit (IMU) of the wearable audio device while the first microphone and the second microphone measure the environmental sound;

calibrating, based on the motion data, acoustic data obtained from the measuring of the environmental sound via the first and second microphones to generate motion-adjusted acoustic data;

using the motion-adjusted acoustic data obtained from the measuring of the environmental sound via the first and second microphones, calculating one or more individualized parameters relating to at least one individualized head related transfer function (HRTF) for the user, wherein the one or more individualized parameters comprise a head width of the user, and wherein the head width is determined at least partly based on an interaural time delay; and using the one or more individualized parameters to adjust audio playback by the wearable audio device.

2. The method of claim 1, wherein the audio playback is adjusted at least partially based on an individualized HRTF.

3. The method of claim 2, wherein the individualized HRTF is generated by adjusting a generic HRTF according to the one or more individualized parameters.

4. The method of claim 2, wherein the individualized HRTF is retrieved from an HRTF library based on the one or more individualized parameters, wherein the HRTF library comprises one or more stored HRTFs corresponding to one or more stored parameters.

5. The method of claim 1, wherein the interaural time delay is determined by:

determining time delay data by cross correlating the motion-adjusted acoustic data corresponding to the first microphone with the motion-adjusted acoustic data corresponding to the second microphone; and determining a maximum value of the time delay data over a predetermined time period.

6. The method of claim 1, wherein the head width is determined further based on a geometric model of the wearable audio device and a head of the user.

7. The method of claim 1, wherein the one or more individualized parameters comprises spectral scattering characteristics.

8. The method of claim 7, wherein the spectral scattering characteristics are determined by:

deriving first spectral data from the motion-adjusted acoustic data captured by the first microphone;

deriving second spectral data from the motion-adjusted acoustic data captured by the second microphone; and comparing the first spectral data to the second spectral data.

9. The method of claim 8, wherein the spectral scattering characteristics include a maximum spectral difference between the first spectral data and the second spectral data.

10. A personalized sound virtualization system, comprising:

a first microphone of a wearable audio device, wherein the first microphone is configured to measure environmental sound, and wherein the first microphone is configured to be in or proximate to a right ear of a user;

a second microphone of the wearable audio device, wherein the second microphone is configured to measure the environmental sound, and wherein the second microphone is configured to be in or proximate to a left ear of the user;

an inertial measurement unit (IMU) of the wearable audio device, wherein the IMU is configured to capture motion data while the first microphone and the second microphone measure the environmental sound; and a processor configured to:

calibrate, based on the motion data, acoustic data obtained from the measuring of the environmental sound via the first and second microphones to generate motion-adjusted acoustic data;

using the motion-adjusted acoustic data obtained from measuring the environmental sound via the first and second microphones, calculate one or more individualized parameters relating to at least one individualized head related transfer function (HRTF) for the user, wherein the one or more individualized parameters comprise a head width of the user, and wherein the head width is determined at least partly based on an interaural time delay; and use the one or more individualized parameters to adjust audio playback by the wearable audio device.

11. The personalized sound virtualization system of claim 10, wherein the audio playback is adjusted at least partially based on an individualized HRTF.

12. The personalized sound virtualization system of claim 11, wherein the individualized HRTF is generated by adjusting a generic HRTF according to the one or more individualized parameters.

13. The personalized sound virtualization system of claim 11, wherein the individualized HRTF is retrieved from an HRTF library based on the one or more individualized parameters, wherein the HRTF library comprises one or more stored HRTFs corresponding to one or more stored parameters.

14. The personalized sound virtualization system of claim 10, wherein the interaural time delay is determined by:

determining time delay data by cross correlating the motion-adjusted acoustic data corresponding to the first microphone with the motion-adjusted acoustic data corresponding to the second microphone; and determining on a maximum value of the time delay data over a predetermined time period.

15. The personalized sound virtualization system of claim 10, wherein the head width is determined further based on a geometric model of the wearable audio device and a head of the user.

16. The personalized sound virtualization system of claim 10, wherein the one or more individualized parameters comprises spectral scattering characteristics.

17. The personalized sound virtualization system of claim 16, wherein the spectral scattering characteristics are determined by:

deriving first spectral data from the motion-adjusted acoustic data captured by the first microphone;

deriving second spectral data from the motion-adjusted acoustic data captured by the second microphone; and comparing the first spectral data to the second spectral data.

18. The personalized sound virtualization system of claim 17, wherein the spectral scattering characteristics include a maximum spectral difference between the first spectral data and the second spectral data.

* * * * *